United States Patent [19]

Kawakami et al.

[11] 4,140,478
[45] Feb. 20, 1979

[54] PROCESS AND APPARATUS FOR HEATING SOLID MATERIALS CONTAINING VOLATILE MATTERS

[75] Inventors: Shigezo Kawakami; Kimio Inoue; Kunihiko Tsuji, all of Kobe, Japan

[73] Assignee: Kobe Steel, Ltd., Kobe, Japan

[21] Appl. No.: 804,740

[22] Filed: Jun. 8, 1977

[30] Foreign Application Priority Data

Jun. 8, 1976 [JP] Japan .................. 51-67305
Sep. 14, 1976 [JP] Japan .................. 51-110551

[51] Int. Cl.² ............... F27B 7/08; C10B 1/06; C10B 1/10
[52] U.S. Cl. ............... 432/13; 202/136; 432/113
[58] Field of Search .............. 432/112, 113, 117, 118, 432/13; 202/136

[56] References Cited

U.S. PATENT DOCUMENTS

| | | | |
|---|---|---|---|
| 1,284,488 | 11/1918 | Steward | 202/136 |
| 2,664,389 | 12/1953 | Rex et al. | 202/136 X |
| 4,029,572 | 6/1977 | Theodore et al. | 432/112 |

*Primary Examiner*—John J. Camby
*Attorney, Agent, or Firm*—Oblon, Fisher, Spivak, McClelland & Maier

[57] ABSTRACT

A process and an apparatus for heating solid materials containing volatile matters. This apparatus includes a heating portion for heating solid materials, and a conveyor portion having a conveyor unit for transporting solid materials. The conveyor is inclined so as to provide an entrance lower in level than an exit thereof, whereby solid materials heated in the heating portion are discharged from an exit to the conveyor unit, while volatile matters vaporized according to the heating are discharged through an entrance of the conveyor unit.

2 Claims, 4 Drawing Figures

PROCESS AND APPARATUS FOR HEATING SOLID MATERIALS CONTAINING VOLATILE MATTERS

BACKGROUND OF THE INVENTION

1. Field of the invention

The invention relates to a process for heating solid materials containing volatile matters, and more particularly to a process and an apparatus for performing the process of the type, in which a conveyor is used for transporting solid materials.

2. Description of the prior art

An externally-heating type rotary kiln has been often used for drying materials. In this respect, in case moisture is desired to be removed and vapor produced by heating is relatively light in weight, it has been a general practice to use a substituting gas of a light weight such as nitrogen gas for purging the vapor thus produced. This appears to pose no problem hitherto. However, in case carbon is derived by thermally decomposing waste tires, waste rubbers and the like, since heavy oils of a large molecular weight have been adsorbed thereto, the vapor and a substituting gas such as nitrogen gas are separated into two layers/ because of a large difference in specific weight between the gas and the vapor, with the result being that a substituting gas only passes above an oil-vapor layer, thus failing to thereby substitute the latter. One of solutions to this problem may be to provide means, in which an exit for gas is positioned on the opposite side of an exit for dried solid materials, for instance, carbon, i.e., on the side of an entrance of a kiln, such that gas counterflows the feeding direction of carbon. However, this provision still fails to avoid a shortcoming in that, due to the characteristic of a rotary kiln, the position of an exit for carbon is lower than an entrance, so that part of oil vapor flows towards the carbon exit, and is condensed in a low temperature portion, and again stuck to carbon again. Thus, the desired drying effect can not be achieved. If an injection rate of a substituting gas is increased excessively, as compared with a rate of oil vapor being produced, there is created turbulence within a rotary kiln, thereby enhancing a gas-substituting effect. However, the turbulence thus created blows carbon powder upwards to carry the same way. For this reason, an increase in injection rate of gas is not preferable.

In a continuous operation of a rotary kiln or a fluidized bed furnace, gas and oil vapor are produced due to decomposition of rubber, and part of the oil vapor is condensed in a low temperature portion to be stuck to carbon, thereby increasing the amount of a volatile matters and odor and thus exerting an adverse effect on the quality of products. In principle, oil which is stuck to carbon may be removed by heating carbon to a temperature above a boiling point of oils to vaporize the oils, and then substituting oil vapor by a dried gas such as an inert gas. However, difficulties arise in removing oils completely for the following reasons.

Oils stuck to carbon provide an average molecular weight of about 200 at a thermally decomposing temperature on the order of 600° C., so that even if oils are vaporized, the specific weight of oil vapor is considerably high. In contrast thereto, nitrogen gas used as a substituting gas is light in weight, resulting in insufficient substitution, and oil vapor tends to be condensed again, thereby adhering to carbon.

SUMMARY OF THE INVENTION

It is the first object of the present invention to provide a process and an apparatus, in which solid materials containing volatile matters are heated so as to lower the content of volatile matters.

It is the second object of the present invention to provide a process and an apparatus, in which solid materials containing volatile matters are heated for vaporizing volatile matters, and then vapor thus produced is withdrawn, without being stuck to solid materials.

It is the third object of the present invention to provide a process and an apparatus, in which thermal decomposition and drying steps for solid materials are carried out all together.

According to the first aspect of the present invention, there are provided a process and an apparatus for heating solid materials containing volatile matters, in which there are provided a heating portion adapted to heat the solid materials, and a conveyor unit for transporting the solid materials, the aforesaid conveyor unit being inclined so as to provide an entrance lower in level than an exit, whereby solid materials may be transported, while being heated, and then discharged from the exit of the conveyor unit, while volatile matters are withdrawn through an entrance of the conveyor unit.

According to the second aspect of the present invention, there are provided a process and an apparatus as defined in the first aspect of the invention, in which a gas supply mechanism is provided on an exit side of the conveyor unit for supplying a substituting gas therein. Various other objects, features and attendant advantages of the present invention will be more fully appreciated as the same becomes better understood from the following detailed description when considered in connection with the accompanying drawings in which like reference characters designate like or corresponding parts throughout the several views, and wherein.

DESCRIPTION OF THE PREFERRED EMBODIMENTS

The present invention will be described in more detail with reference to the accompanying drawings.

Figure 1:
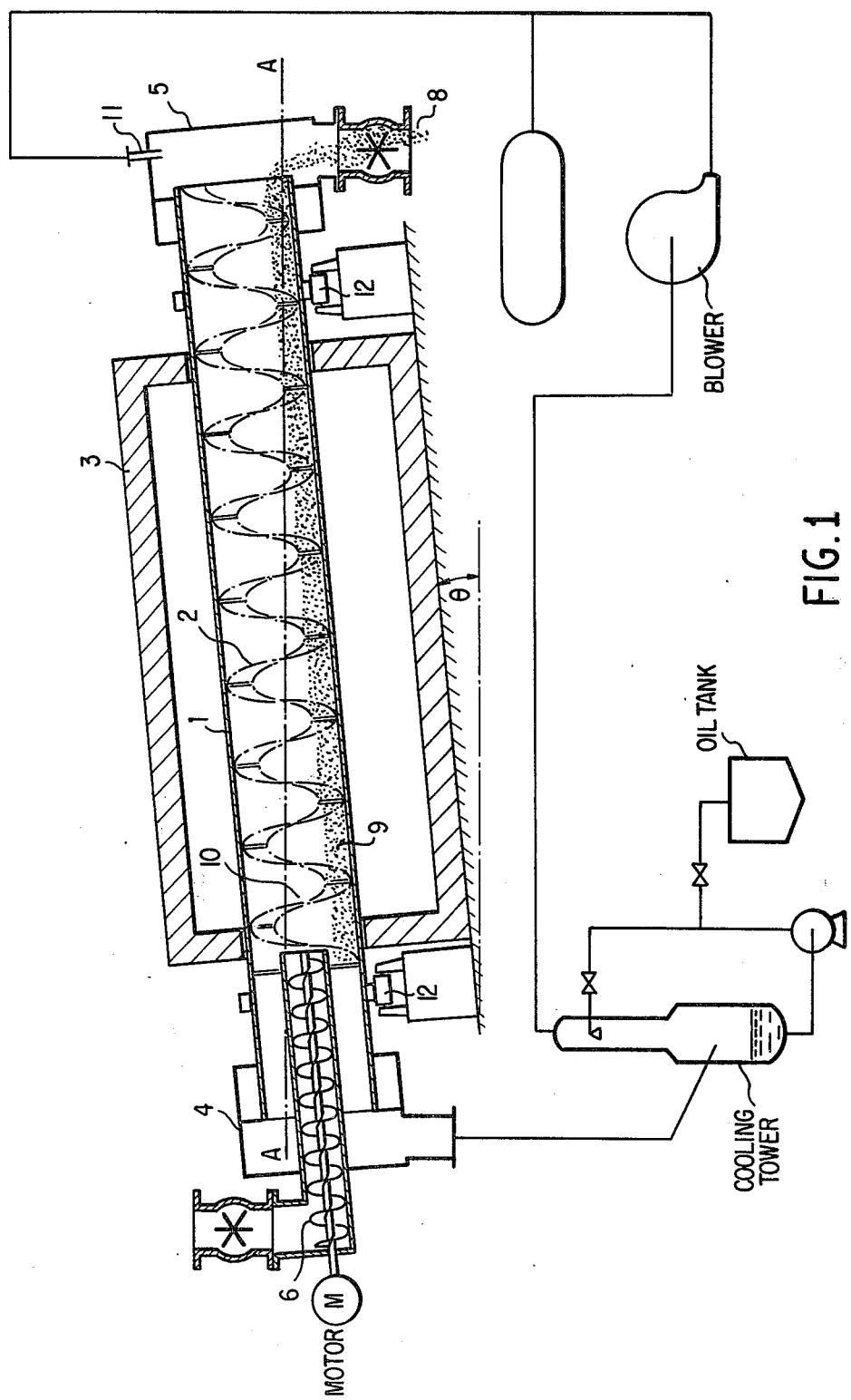
FIG. 1 is a longitudinal cross-sectional view of an apparatus of a rotary conveyor type, embodying the present invention.

FIG. 1 shows a rotary conveyor serving as a carbon transporting means for drying carbon containing volatile matters. A cylinder having a spiral feed blade 2 therein is supported through the medium of guide wheels on supporting-rollers 12, and driven by drive means not shown. This arrangement makes no difference to that of a prior art rotary conveyor. Shown reference numeral 3 is a heating furnace, in which heat is applied through the periphery of a cylinder 1 to the contents therein to a given temperature. Shown by reference numeral 4 is an entrance hood which seals the cylinder from atmosphere in air tight relation. Shown by reference numeral 5 is an exit hood which seals the cylinder from atmosphere in air tight relation. Shown by reference numeral 7 is a gas bleeding port while 8 is a carbon discharge opening, and the opening 8 is sealed from atmosphere by means of a rotary valve. Shown by reference numeral 6 is a screw feeder for feeding material into the cylinder, and a charge opening for the screw feeder 6 is sealed from atmosphere by means of a rotary valve. The entire apparatus is inclined at an angle $\theta$ to a horizontal plane, with an output side being higher than an input side.

When undried or wet carbon is fed by means of the screw feeder 6 to a feed blade, then the carbon is transported under agitation by means of a feed blade rotating with the cylinder, as shown, toward a discharge side, and then into the exit hood 5 past a rotary valve from the exit 8 outside. The above operation is no different from that of a prior art rotary conveyor. In this case, carbon is heated by a heating furnace to a given temperature in its course to the exit, so that oils stuck to carbon are vaporized into vapor, thus separating from carbon. When an inert gas such as nitrogen ($N_2$) is injected through a gas-injecting port 11 provided in the exit hood 5 for substitution, then a heavy oil vapor is forced downwards by the combined aid of gravity, towards the entrance and is discharged through the gas bleeding port 7 outside.

In case an injection rate of a substituting gas is so adjusted that gas does not exceed a height nor oil vapor flows towards the carbon exit due to its diffusing action, i.e., a level of a line A—A representing a horizontal plane, as shown, then oil vapor will not flow towards the carbon exit so that oil vapor may be effectively separated from carbon. In this respect, an injection rate of a substituting gas should only be such as to suppress an upward flow of oil vapor beyond the horizontal plane 10, so that an injection rate of gas may be reduced. As a result, a substituting gas does not cause turbulence which blows carbon upwards nor carries carbon into a gas treating device, along with gas, thereby retaining a desired yield of carbon. In addition, production of a secondary product such as carbon deposite or sludge may be minimized, insuring a desired operation of a gas treating device.

Oil vapor of a certain amount is fed under the action of a rotary conveyor, commensurate to a theoretical transporting volume of a rotary conveyor. However, oil vapor is present in a gaseous form, so that the amount of oil vapor may be negligible, as compared with the mass of carbon being transported. However, if a thorough or strict drying condition is required, it is possible to prevent an oil vapor from being transported, by providing such as gas bleeding holes or cut-away portions in the feed blade 2 in a rotary conveyor.

In place of a transporting mechanism such as a rotary conveyor as used in the embodiment of FIG. 1, the following transporting means may be used under the same principle.

Figure 2:
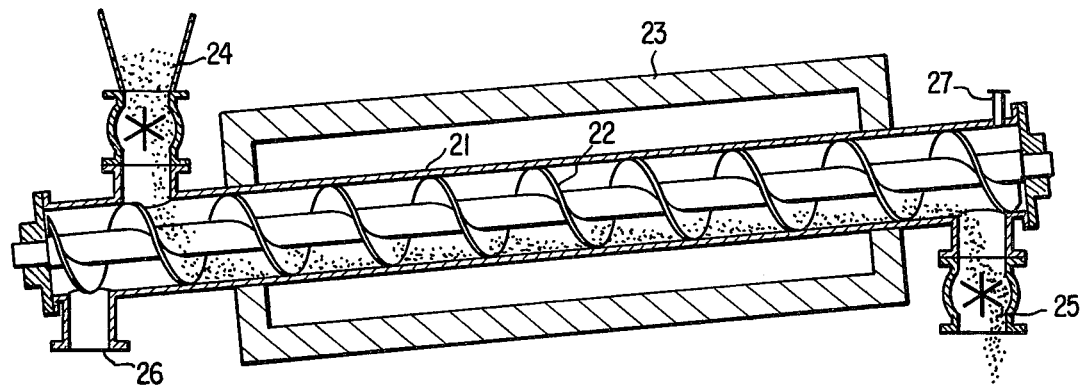
FIG. 2 is a longitudinal cross-sectional view of another apparatus of a screw conveyor type, embodying the present invention.

FIG. 2 shows a screw conveyor serving as a transporting means. Shown by reference numeral 21 is a screw-conveyor-outer cylinder, by 22 a transporting or feed screw which is rotated at a given r.p.m. by drive means not shown. Shown by reference numeral 23 is heating means which heats a screw conveyor from its cylinder to a given temperature. In this case as well, like the rotary conveyor system, the exit side is higher than an entrance side. Carbon is charged through an entrance having a rotary valve and then fed by the screw towards the exit side, during which oils are vaporized in a heating portion, and then carbon is discharged through an exit 25 having a rotary valve, outside. Oil vapor is forced to flow by the gravity thereof, under the action of a substituting gas being injected through a gas injection port 27 provided on the exit side, towards a gas bleeding port 26 provided on an entrance side which is positioned lower than the exit.

Figure 3:
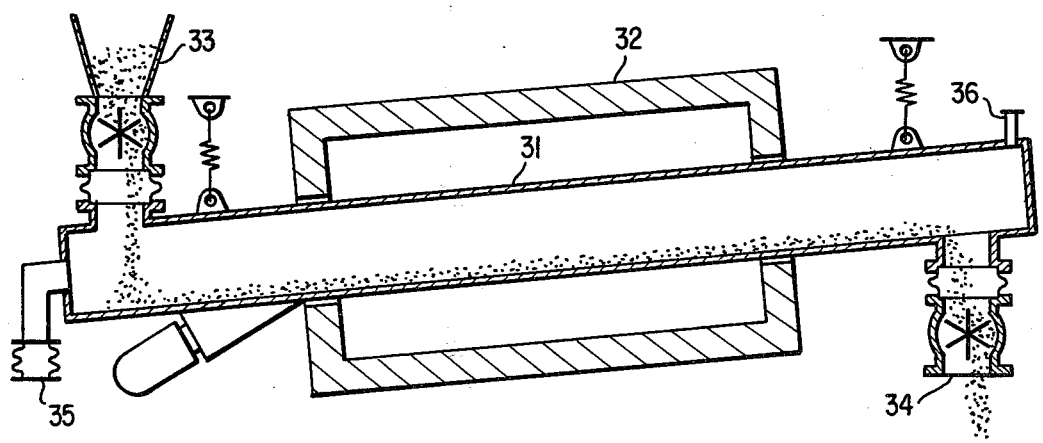
FIG. 3 is a longitudinal cross-sectional view of a vibrating conveyor unit which is different from those shown in FIGS. 1 and 2.

FIG. 3 shows vibrating conveyor serving as a transporting mechanism. Shown by reference numeral 31 is a vibrating conveyor through, with its exit side being higher in level than its entrance side as in the preceding embodiment. Shown by reference numeral 32 is heating means which heats the vibrating conveyor through its periphery, to a given temperature including a carbon entrance 33, and an carbon exit 34 having a rotary valve as in the case of the carbon entrance 33. Shown by reference numeral 35 is a gas bleeding port and by 36 a substituting gas injection port.

During the time which carbon is being transported by the vibrating conveyor from its entrance towards its exit, carbon is heated so that oils are vaporized and oil vapor flows by its gravity under the action of a substituting gas, towards a gas bleeding port 35 positioned at a lower level, and is then discharged therefrom. The principle incorporated therein is the same as that of the preceding embodiment.

Figure 4:
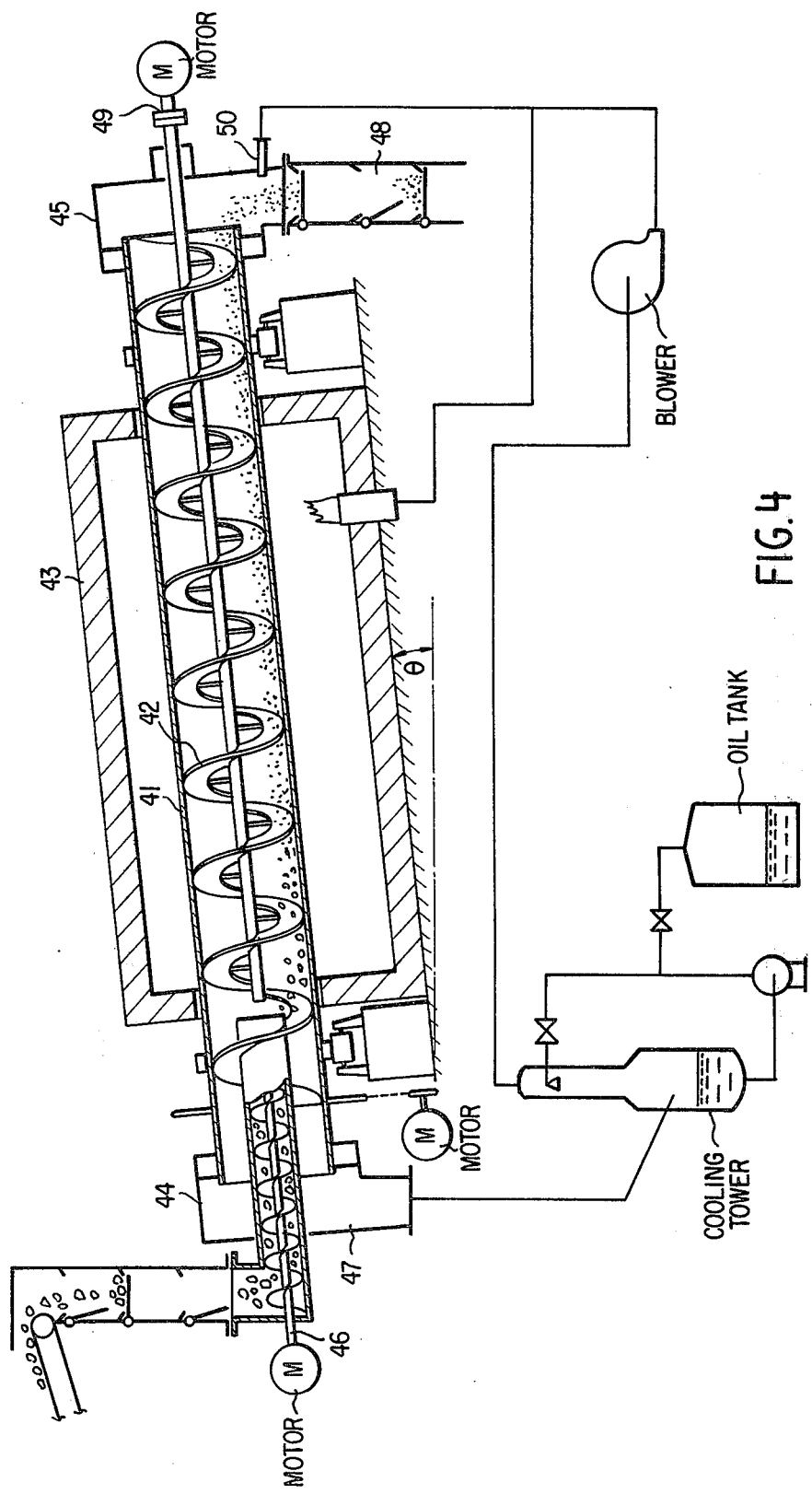
FIG. 4 is a longitudinal cross-sectional view of one embodiment of the present invention, which permits carrying out both the thermal decomposition and the drying steps all together.

FIG. 4 shows an embodiment wherein granulated waste rubber is subjected to both thermal decomposition and drying all together.

A rotary kiln 41 is rotated at a given r.p.m. by means of a drive device not shown. Positioned within the rotary kiln 41 is a spiral conveyor 42 adapted to transport materials and rotated at a r.p.m. different from that of the rotary kiln 41, by means of a rotary drive means 49. The other portions remain substantially the same as those of the embodiment of FIG. 1.

Waste rubber fed into the rotary kiln 41 by means of a screw feeder 46 is transported by means of the spiral conveyor 42 towards an exit of the rotary kiln 41, during which waste rubber is subjected to thermal decomposition with heat from a heating furnace 43. The waste rubber is thermally decomposed into heavy oil, heavy gas, and carbon. In this respect, the rotary kiln 41 is inclined, with its entrance side maintained at a lower level, so that heavy oil and heavy gas flow towards the entrance of the rotary kiln 41 and then through a heavy oil exit 47 provided in an entrance hood 44 outside of the rotary kiln.

On the other hand, carbon is transported by means of the spiral conveyor 42 towards an exit side of the rotary kiln 41, while oils stuck to carbon are completely vaporized with heat from the heating furnace 43, and forced towards the entrance of the rotary kiln 41 by noncondensable gas supplied through a substituting gas supply port 50 from a cooling tower 51, then out through a heavy oil discharge port outside. In addition, sufficiently dried carbon may be discharged through a carbon exit 48 provided in the exit hood 45 outside, without contacting oil vapor in the neighborhood of an exit of the rotary kiln 41.

The spiral conveyor 42 rotates at r.p.m. different from that of the rotary kiln 41, so that carbon produced during thermal decomposition are dried at a high efficiency, without being stuck to the inner wall of the rotary kiln 41.

As in the preceding embodiment, a rotary kiln is inclined, with an input end or an entrance being maintained lower, so that in the same manner as in the preceding embodiment carbon may be discharged, with no heavy oil vapor being stuck to carbon again.

Now, description will be turned to the data obtained when carbon is dried in a conventional rotary conveyor which is inclined, with an input end positioned at a higher level as well as to the test data obtained, when carbon is dried in an apparatus according to the present invention.

Firstly, granulated waste tire is supplied at a feed rate of 100 kg/hr into a conventional type rotary kiln, and then subjected to thermal decomposition at a temperature of 650° C. to obtain carbon. Volatile matters contained in carbon are 8.4% in content. Carbon was fed at a feed rate of 100 kg/hr into a rotary kiln which was inclined in a manner that an input end was positioned higher in level than an output end thereof, and then carbon was dried at a temperature of 550° C. On the other hand, carbon obtained in the same manner was supplied at a feed rate of 100 kg/hr into the rotary kiln according to the present invention to be dried at a temperature of 550° C. Then the amount of volatile matters contained in dried carbon obtained from respective rotary kilns were analyzed. The results are that, as shown in Table 1, the content of volatile matters in the case of a conventional type conveyor is 2.25%, while the content of volatile matter in the case of the conveyor according to the present invention is 1.5%.

Table 1

|  | conventional type rotary kiln | rotary kiln according to the invention |
|---|---|---|
| heating temperature | 550° C. | 550° C. |
| r.p.m. of rotary kiln | 5 rpm | 5 rpm |
| feed rate of carbides | 100 kg/hr | 100 kg/hr |
| content of volatile matters contained in carbides dried | 2.25 wt % | 1.5 wt % |
| benzene discoloration | 1.4 – 21.8% | 90.4 – 98.5% |

As can be seen from the above table, the drying efficiency of the apparatus is much improved according to the present invention, as compared with a conventional process, and yet a benzene-discoloration of carbon obtained according to the present invention is markedly improved.

Accordingly, carbon obtained according to the present invention is well adapted for use as a rubber reinforcing material which dictates a high benzene colored transparency, and hence waste tire and waste rubber may be effectively reclaimed.

Description has been given of the present invention with reference to a drying process of carbon, to which oils are stuck, and thermal decomposition and drying steps of waste tire. However, the process according to the present invention may be applied to any kind of materials, as far as the material is adapted to be transported by the aforesaid transporting mechanism and may be heated so as to vaporize liquid stuck to the material, and in addition a substituting gas lighter than the vapor thus produced may be suitably selected.

Even in case waste plastics tar sand, oil shale are heated so as to recover oils, the sticking of oil vapor to solid materials remaining after heat treatment or the sticking of oils to an exit-side wall of a rotary kiln may be prevented, thereby improving the recovery rate of oils to a large extent.

The present invention is also applicable to the thermal decomposition of urban garbage or dry distillation of coal.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by letters patent of the United States is:

1. A process for heating solid materials containing volatile matters, in which solid materials containing volatile matters are heated in a conveyor including a substituting gas injection port, a gas bleeding port, an entrance or input side, and an exit portion with its entrance or input side being lower in level than its exit portion, comprising the steps of:

applying heat through the periphery of said conveyor to said solid materials;

transporting said solid materials to said exit portion of said conveyor, while being heated therein, to thereby vaporize volatile matters;

injecting a substituting gas through said substituting gas injection port provided on the exit portion of said conveyor into said conveyor unit, said gas being lighter in weight than vapor thus produced; and purging vapor heavier than said substituting gas towards said gas bleeding port provided on the entrance side of said conveyor by utilizing a difference in gravity between said vapor and said gas, said gas bleeding port being lower than the exit portion of said conveyor, thereby preventing diffusion of vapor thus produced to preclude sticking to said materials of liquid obtained from condensation of vapor due to a lower temperature prevailing at said exit portion of said conveyor.

2. A process for heating solid material containing volatile matters as set forth in claim 1 further comprising:

adjusting the injection rate of said substitute gas such that said substitute gas does not exceed the height of a predetermined horizontal plane in said conveyor.

* * * * *